United States Patent
Yuyama

(10) Patent No.: US 7,843,507 B2
(45) Date of Patent: Nov. 30, 2010

(54) IMAGE CAPTURING APPARATUS, POWER CONTROLLING METHOD AND MEDIUM STORING A PROGRAM FOR EXECUTING THE METHOD

(75) Inventor: Masami Yuyama, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 947 days.

(21) Appl. No.: 11/637,828

(22) Filed: Dec. 12, 2006

(65) Prior Publication Data
US 2007/0132879 A1    Jun. 14, 2007

(30) Foreign Application Priority Data
Dec. 12, 2005    (JP) .............. 2005-357082

(51) Int. Cl.
*H04N 5/225*    (2006.01)
(52) U.S. Cl. .................................... 348/372
(58) Field of Classification Search ......... 348/372–376, 348/208.16, 333.13
See application file for complete search history.

(56) References Cited

U.S. PATENT DOCUMENTS

| | | | |
|---|---|---|---|
| 6,111,609 A * | 8/2000 | Stevens | 348/372 |
| 6,362,851 B1 * | 3/2002 | Lavelle et al. | 348/333.01 |
| 6,643,458 B2 | 11/2003 | Sakamoto | |
| 2003/0081142 A1 | 5/2003 | Iijima | |
| 2005/0094024 A1 * | 5/2005 | Sato | 348/360 |

FOREIGN PATENT DOCUMENTS

| | | |
|---|---|---|
| CN | 1414444 A | 4/2003 |
| CN | 1420389 A | 5/2003 |

(Continued)

OTHER PUBLICATIONS

Chinese Office Action (and English translation thereof) dated Dec. 5, 2008, issued in a counterpart Chinese Application.

(Continued)

*Primary Examiner*—David L Ometz
*Assistant Examiner*—Akshay Trehan
(74) *Attorney, Agent, or Firm*—Holtz, Holtz, Goodman & Chick, PC

(57) ABSTRACT

An image capturing apparatus includes a power source controller for controlling a power supply to the image capturing apparatus to be in one of: (i) an on state, and (ii) an off state. A detector detects when any one of a plurality of operation members of the image capturing apparatus is operated when the power supply is in the off state. A brightness acquiring section controls an image capturing unit of the image capturing apparatus to acquire a brightness of an environment of the image capturing apparatus, when the detector detects that one of the operation members has been operated when the power supply is in the off state. A determining section determines whether or not the acquired brightness is above a predetermined level. And an image capturing controller permits the image capturing unit to capture an image of a subject only if the determining section determines that the acquired brightness is above the predetermined level.

12 Claims, 4 Drawing Sheets

FOREIGN PATENT DOCUMENTS

| | | |
|---|---|---|
| JP | 2001-069235 A | 3/2001 |
| JP | 2001-094642 A | 4/2001 |
| JP | 2001-184143 A | 7/2001 |
| JP | 2004-128731 A | 4/2004 |
| JP | 2005-274807 A | 10/2005 |

OTHER PUBLICATIONS

Japanese Office Action dated Jan. 6, 2009, issued in counterpart Japanese application JP 2005-357082.

Chinese Office Action (and English translation thereof) dated Jul. 11, 2008, issued in a counterpart Chinese Application.

* cited by examiner

IMAGE CAPTURING APPARATUS, POWER CONTROLLING METHOD AND MEDIUM STORING A PROGRAM FOR EXECUTING THE METHOD

CROSS-REFERENCE TO RELATED APPLICATIONS

This application is based on and claims the benefit of priority of Japanese Patent Application No. 2005-357082 filed on Dec. 12, 2005, the entire contents of which are incorporated herein by reference.

BACKGROUND OF THE INVENTION

1. Field of the Invention

The present invention relates to an image capturing apparatus, power controlling methods to be performed in the image capturing apparatus and media storing programs for performing the methods.

2. Background Art

In conventional digital cameras, a "power on" key must be operated to turn on the power source. In particular, the "power on" key may be a push button located at a position on the digital camera body where the push button is easy to operate. When, for example, a user carries around a digital camera in a bag with him or her, the digital camera can possibly hit other items in the bag, thereby operating (e.g., depressing) the push button. If the digital camera is inadvertently turned on in this manner, electric power is consumed uselessly even though the digital camera is not used. In order to solve this problem, for example, Unexamined Japanese Patent Publication 2001-184143 discloses that when the "power on" switch continues to be operated for a predetermined time the digital camera determines that the power source is undesirably turned on, thereby preventing useless power consumption.

SUMMARY OF THE INVENTION

It is therefore an object of the present invention to provide an image capturing apparatus, a power controlling method to be performed in the apparatus and a storage medium that maintain a user's convenience while preventing useless consumption of electric power due to erroneous turning-on of the power source.

In order to achieve the above object, according to one aspect of the present invention an image capturing apparatus is provided which includes: a power source controller for controlling a power supply to the image capturing apparatus to be in one of: (i) an on state, and (ii) an off state; a plurality of operation members; an image capturing unit; a detector which detects when any one of the plurality of operation members is operated when the power supply is in the off state; a brightness acquiring section which controls the image capturing unit to acquire a brightness of an environment of the image capturing apparatus, when the detector detects that one of the operation members has been operated when the power supply is in the off state; a determining section which determines whether or not the acquired brightness is above a predetermined level; and an image capturing controller which permits the image capturing unit to capture an image of a subject only if the determining section determines that the acquired brightness is above the predetermined level.

According to another aspect the present invention a power controlling method is provided which is to be performed in an electronic apparatus including a plurality of operation members, an image capturing unit, and a power source controller for controlling a power supply to the image capturing apparatus to be in one of: (i) an on state, and (ii) an off state. The method includes: detecting when any one of the plurality of operation members is operated when the power supply is in the off state; controlling the image capturing unit to acquire a brightness of an environment of the apparatus, when it has been detected that one of the operation members has been operated when the power supply is in the off state; determining whether or not the acquired brightness is above a predetermined level; and permitting the image capturing unit to capture an image of a subject only if it is determined that the acquired brightness is above the predetermined level.

According to a further aspect the present invention a computer readable storage medium stores a computer program that is executable to perform the method described above in an electronic apparatus.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

Figure 1A:
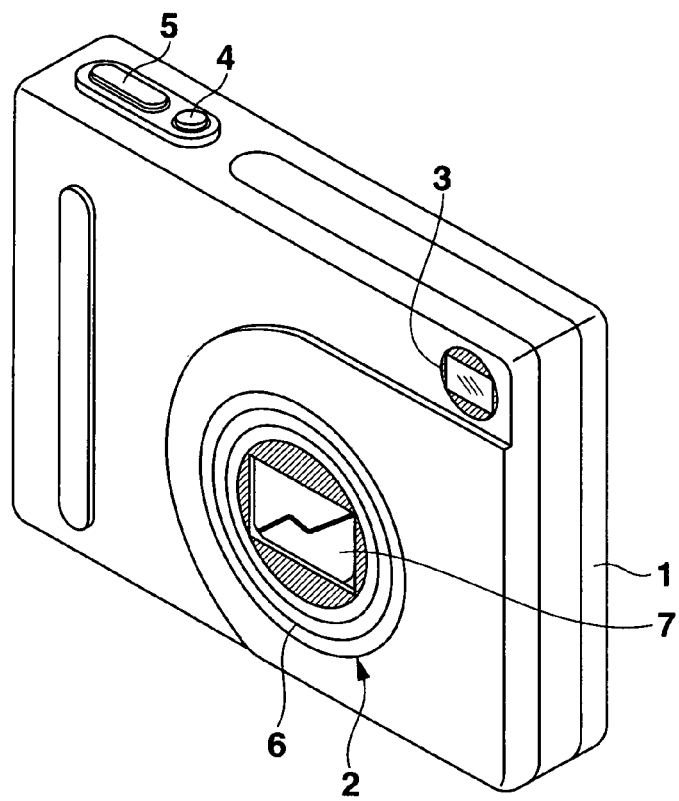
FIGS. 1A and 1B are front and back perspective views, respectively, of a digital camera used in several embodiments of the invention.
Figure 1B:
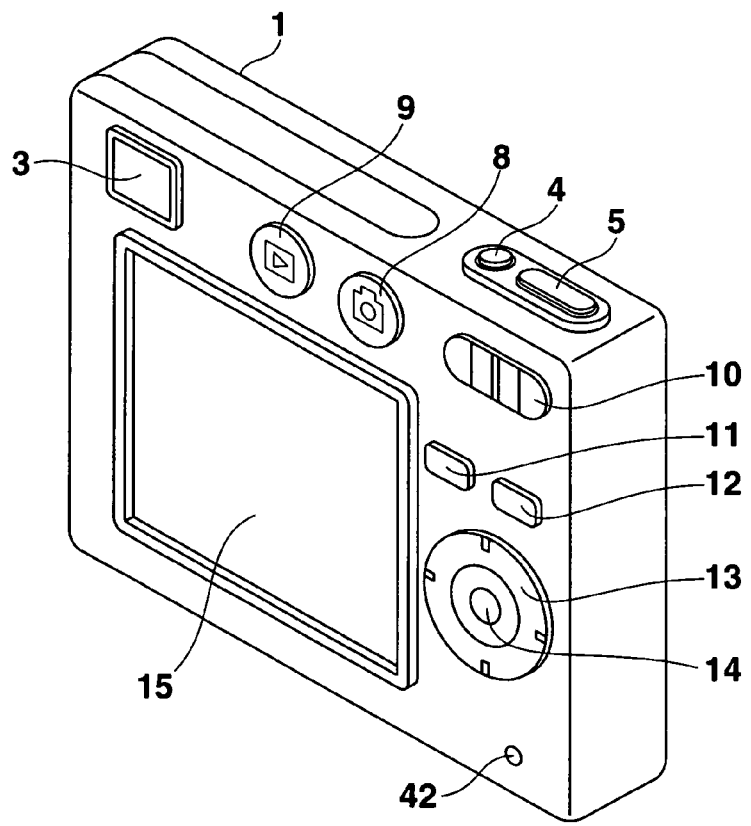

Referring to the accompanying drawings, one embodiment of the present invention will be described. FIGS. 1A and 1B are front and back perspective views, respectively, of a digital camera 1 according to one aspect of the present invention. The digital camera includes an optical zoom mechanism. As shown in FIG. 1A, a thin substantially rectangular camera body 1 has an image capturing lens unit 2 and an optical finder 3 on a front thereof, and a "power on" key 4 and a shutter key 5 on a left end part of an upper surface thereof.

The image capturing lens unit 2 includes an optical lens group (not shown), which includes a zoom lens and a focus lens, which is received within a stepwise extendable lens barrel 6 to be movable along an optical axis thereof. The image capturing lens unit 2 is retracted within the camera body 1, as shown in FIG. 1A, when the power source is off or when the operative mode is a playback mode. The image capturing lens unit 2 is protruded forward when the power source is turned on in a record or image-capture mode or when the power source is on and the operative mode is changed to the record mode from a different mode.

An openable lens cover 7 is provided at an opening of the lens barrel 6 to protect the lens when the lens is not used. The lens cover 7 is openable independently of the extension/retraction of the image capturing lens unit 2 (or lens barrel 6). As shown in FIG. 1B, an optical finder 3, a "record mode" key 8 to set the camera in the record mode, a "playback mode" key 9 to set the camera in a playback mode, a zoom operation key 10, a menu key 11, a display key 12, a 4-direction key 13, a set key 14 provided within the 4-direction key 13, a liquid crystal monitor 15 and a speaker hole 42 are all provided on a back of the camera. The "record mode" key 8 and the "playback mode" key 9 are push-button keys in the example shown in FIG. 1B.

The "record mode" key 8 and the "playback mode" key 9 not only have the record mode setting function and the playback mode setting function, respectively, but also a power-source turn-on function that is performed when operation of the "record mode" key 8 or the "playback mode" key 9 is detected when the power source is off. When the power source is off, the user is only required to push the "record mode" key 8 or "playback mode" key 9 to turn on the power source such that a desired mode (record mode or playback mode) can be used. Thus, when the power source is off, pushing the "record mode" key 8 turns on the camera in the record mode, and pushing the "playback mode" key 9 turns on the camera in the playback mode. The "power on" key 4 is also operable to turn on the camera. To prevent the occurrence of an operation error of the "power on" key 4, when the "power on" key 4 continues to be operated for a predetermined time, the power source is changed from the off state to the on-state.

The liquid crystal monitor 15 includes a color liquid crystal display panel with a back light and displays, in the record mode, a captured image, a recorded image, a size/capacity of an image to be captured and recorded, a setting screen/menu via which an image processing method is set, and various information including the number of times of occurrence of key operation errors.

The camera body 1 has a slot (not shown) in its bottom into which an external memory 33 such as a memory card, which may be a recording medium to record a captured image, is insertable into the camera body. A speaker 41 sounds (outputs) a buzzer or alarm sound through the hole 42 when a key operation error is detected.

Figure 2:
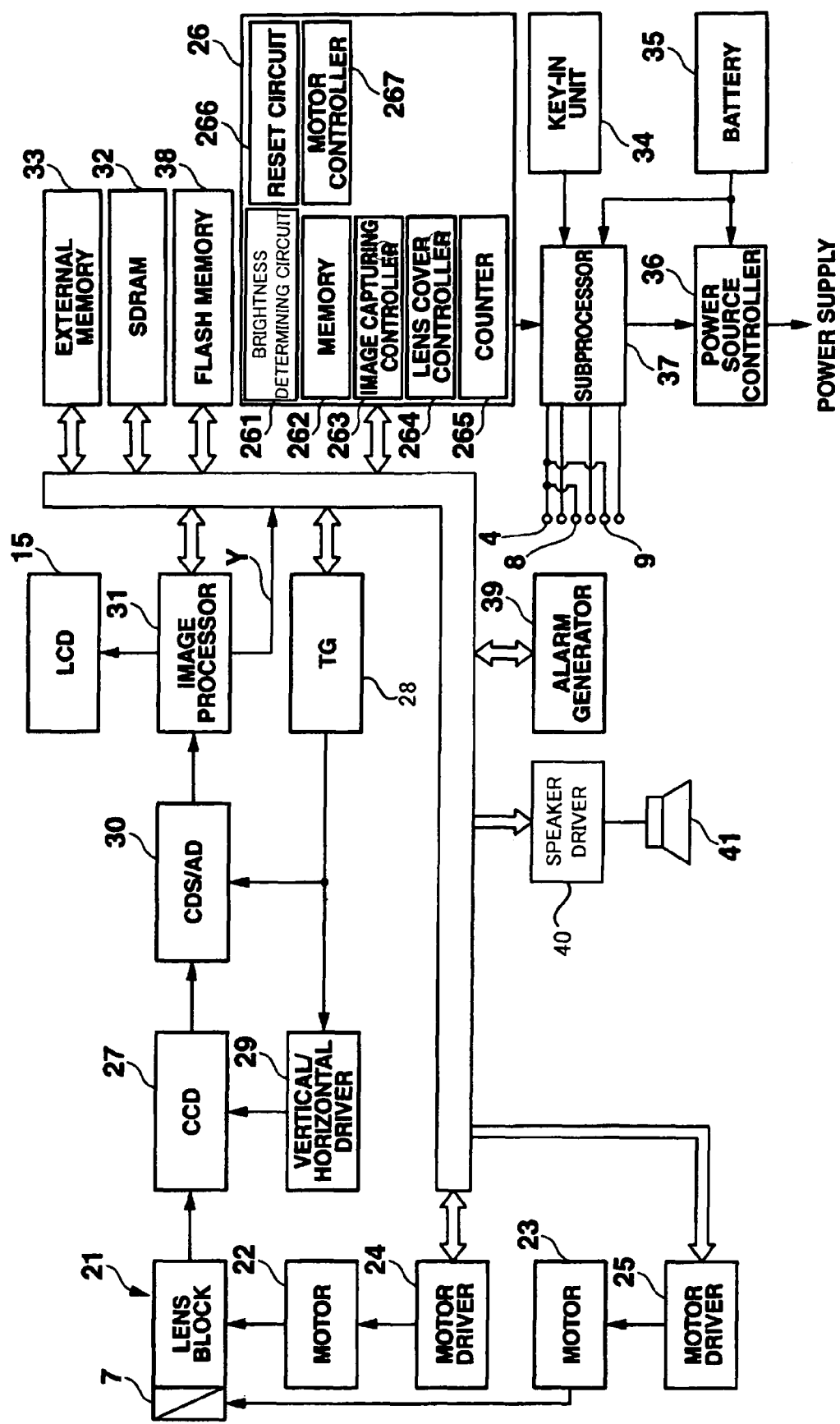
FIG. 2 is a block diagram of electronic components of the digital camera.

FIG. 2 is a block diagram indicative of an electronic composition of the digital camera. A lens block 21 includes the lens barrel 6, the optical lens group, and the lens cover 7. The lens barrel 6 and the optical lens group are driven along the optical axis by a motor 22 provided within the lens barrel 6. The lens cover 7 is opened/closed by a second motor 23 provided within the lens barrel 6.

The motor 22 is driven by a motor driver 24 under the control of a motor controller 267 to be described in more detail later. The second motor 23 is driven as required by a motor driver 25 under the control of a lens cover controller 264 to be described in more detail later. The digital camera includes a focus motor and motor driver for driving the focus lens and a drive mechanism for driving a mechanical shutter and a mechanical throttle, although these components are not shown.

A CPU 26 includes a brightness determining circuit 261, a memory 262, an image capturing controller 263, a lens cover controller 264, a counter 265, a reset circuit 266 and a motor controller 267 to control various processing steps to be performed in the digital camera.

A CCD 27 that captures an optical image focused thereon through the lens block 21 is disposed after the lens block 21 on the optical axis. The CCD 27 is driven by a vertical/horizontal driver 29 based on a timing signal produced by a timing generator (TG) 28 to capture an optical analog image of a subject based on electric charge quantities produced on pixels of the CCD 27 through the lens block 21, and the CCD forwards the optical image data to a signal processor (CDS/AD) 30.

The signal processor 30 includes a CDS circuit that eliminates noise included in an output signal from the CCD 27 in accordance with a correlation double sampling system, and an A/D converter which converts the noise-free analog image signal from the CDS circuit to a digital image signal, and which forwards this digital signal to the image processor 31.

The image processor 31 performs a processing operation including a pedestal clamping operation on the received image signal and converts a resulting signal to a luminance (Y) signal and a chrominance (UV) signal, and also performs digital signal processing steps such as auto white balance, configuration emphasis and pixel interpolation/extrapolation to improve the image quality. The YUV data obtained in the image processor 31 are sequentially stored in SDRAM 32. In the record mode, each time one frame of image data is stored, it is converted to a video signal, which is then forwarded to and displayed as a through image on the liquid crystal monitor 15.

When operation of the shutter key 5 is detected in the record mode, the image data stored temporarily in the SDRAM 32 from the CCD 27, via the signal processor 30 and the image processor 31, is compressed by the CPU 20 and finally stored as a still-image file having a predetermined format in the external memory 33. The still image file recorded in the external memory 33 is read out by the CPU 26 in accordance with an operation by the user in the playback mode, is loaded as YUV data on the SDRAM 32, and then is displayed on the liquid crystal monitor 15.

The digital camera includes a key-in unit 34 including the "power on" key 4, the "record mode" key 8, the "playback mode" key 9, and the shutter key 5. The digital camera also includes a rechargeable battery such as a nickel-hydrogen cell 35, a power source controller 36 and a subprocessor 37. The power source controller 36 feeds power from the battery 35 to the camera components of the optical system including the motors 22 and 23 and motor drivers 24 and 25, and the image capturing system including the CCD 27, the timing generator 28, the vertical/horizontal driver 29, the signal processor 30 and the image processor 31.

The subprocessor 37 controls the power source controller 36 so as to feed appropriate power from the power source 35 to the appropriate camera elements in accordance with a command from the CPU 26 and constantly scans the respective switches of the key-in unit 34 to check whether any of them is operated, whether or not the power source is turned on or off. When the user operates any one of the keys, the subprocessor 37 delivers a corresponding signal to the CPU 26. It is to be noted that the above-mentioned functions of the subprocessor 37 may be implemented by operating the CPU 26 in a so-called sleep state where the CPU 26 performs a key-scanning operation when the power source is off. In this case, the subprocessor 37 is not needed.

A flash memory 38 stores various programs (including AE, AF and AWB control programs) that cause the CPU 26 to control the respective components of the camera, as well as various data to be used by the CPU 26. According to this embodiment, the flash memory 38 stores a program which causes the CPU 26 to cooperate with the subprocessor 37 to act as the control means of the embodiment. The flash memory 38 is of a non-volatile type and stores various setting data changed or set by a user, as required. The flash memory 38 stores the number of times that key operation errors, namely inadvertent operations of the "record mode key 8" and "playback mode key 9", have occurred, thereby functioning as a counter. The stored number of occurrences of key operation errors in the flash memory 38 is deleted by the reset circuit 266 when a power-source turn-on command is validated, as described in more detail below. According to alternative embodiments of the present invention, inadvertent operations of the "power on" key 4 are also possible, and the number of occurrences of key operation errors including inadvertent operations of the "power on" key 4 may be stored in the flash memory 38.

An alarm generator 39 generates an alarm signal in accordance with a command from the CPU 26 as required and forwards it to a speaker driver 40, which causes the speaker 41 to produce an alarm based on the alarm signal.

Figure 3:
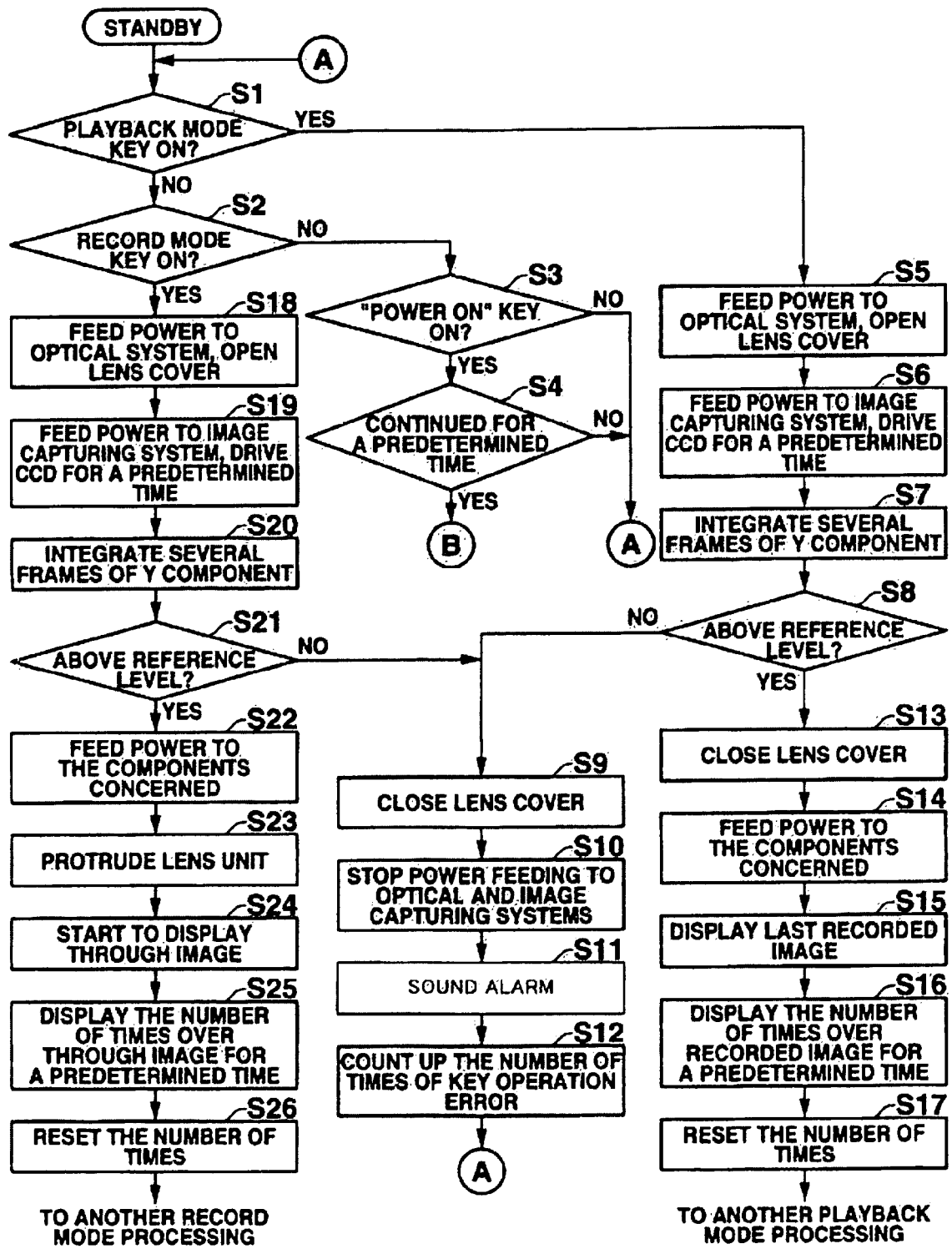
FIG. 3 is a flowchart indicative of operations of the digital camera to be performed when a power source turn-on command is given.

Operation of the camera of this embodiment of the present invention will be described next. FIG. 3 is a flowchart indicative of operations of the digital camera to be performed when the "power on" key 4, the "record mode" key 8 or the "playback mode" key 9 is operated (that is, to input a power source turn-on command) in the standby state before the power source is turned on. In the standby state where the power source is not yet turned on, the subprocessor 37 constantly scans the "power on" key 4, the "record mode" key 8 and the "playback mode" key 9 to see whether or not they are operated. Unless a key is operated (NO in each of steps S1-S3), the subprocessor 37 continues to scan the keys.

(Operation of the "playback mode" key 9)

When the subprocessor 37 detects that the "playback mode" key 9 has been operated (YES in step S1), a corresponding operation signal is delivered from the subprocessor 37 to the CPU 26. The CPU 26 causes the subprocessor 37 to feed power to the optical system, using the signal as a trigger, and hence causes the lens cover controller 264 to operate, thereby opening the lens cover 7 (step S5).

Subsequently, the CPU 26 causes the subprocessor 37 to feed power to the image capturing system in accordance with a command from the image capturing controller 263, and the CPU 26 causes the CCD 27 to operate for a predetermined time (step S6). Then, the image processor 31 integrates several frames of a luminance (Y) component of the captured image signal corresponding to the predetermined time that the CCD 27 has been caused to operate (step S7). The image processor 31 acquires the brightness of the environment of the camera body 1 based on the integrated value of the several luminance frames. The brightness determining circuit 261 determines whether or not the acquired brightness is above a reference value stored in the memory 262 (step S8). Instead of causing the CCD 27 to operate for a predetermined time, the CPU 26 may cause the CCD 27 to operate only once, and the brightness of the environment of the camera body 1 may be determined based on one captured frame.

When the brightness determining circuit 261 determines that the brightness of the environment of the camera body 1 is below or equal to the reference value stored in the memory 262 (NO in step S8), the CPU 26 determines that the "playback mode" key 9 was erroneously operated, for example, due to movement of the camera body 1 or interference by other items in a bag in which the user carries the camera. In accordance with this determination, the CPU 26 controls the lens cover controller 264 to close the lens cover 7 (step S9), and then stops the feeding of power to the optical system and the image capturing system (step S10).

Subsequently, the alarm signal generator 39 generates an alarm signal, causes the speaker driver 40 to drive the speaker 41 with the alarm signal, thereby sounding an alarm, which notifies the user that the "playback mode" key 9 was operated erroneously (step S11). The counter 265 counts the number of occurrences of key operation errors stored in the flash memory 38 and increases the number of occurrences stored in the flash memory 38 by one (step S12). The CPU 26 then terminates its operation corresponding to the operation of the "playback mode" key 9 and returns to step S1. That is, the CPU 26 invalidates the power-source turn-on command and the playback mode set command given by the operation of the "playback mode" key 9 and causes the subprocessor 37 to continue to scan the keys until a next key operation is detected.

When the determination in step S8 is YES (that the brightness determining circuit 261 determines that the brightness of the environment of the camera body 1 is above the reference value), the lens cover controller 264 closes the lens cover 7 (step S13), and the subprocessor 37 feeds power to the components of the camera concerned with the playback mode in addition to the optical and image-capturing systems (step S14), and then the camera shifts to a playback mode, where the CPU 26 displays the most recently recorded image stored in the external memory 33 on the liquid crystal monitor 15 (step S15).

In step S14 the subprocessor 37 may stop feeding power to the optical and image capturing systems and instead feed power to the playback system only.

Further, at this time, the CPU 26 reads the number of occurrences of key operation errors stored in the flash memory 38, and displays the number for a predetermined time over a part of the recorded image displayed on the display (step S16). Then, the reset circuit 266 resets the recorded number of times of occurrence of key operation errors (step S17). Then, the CPU 26 performs other operations in the playback mode.

(Operation of the "record mode" key 8)

When the subprocessor 37 detects operation of the "record mode" key 8 independent of whether or not the "playback mode" key 9 was detected (YES in step S2), the CPU 26 performs steps S18-S20 which are similar to steps S5-S7 performed upon operation of the "playback mode" key 9, thereby acquiring the brightness of the environment of the camera body 1 based on a value obtained by integrating several frames of the luminance (Y) component of the captured image signal. At this time, the brightness determining circuit 261 determines whether or not the brightness is above the reference value (step S21).

When the brightness is below or equal to the reference value (NO in step S21), the CPU 26 determines that the operation of the "record mode" key 8 was erroneous. Then, the CPU 26 proceeds to and performs steps S9-S12, thereby closing the lens cover, stopping the feeding of power to the optical and image capturing systems, generating an alarm and then counting up and increasing by one the stored number of occurrences of key operation errors. Then, the CPU 26 returns to step SI. That is, the CPU 26 invalidates the power-source turn-on command and the record-mode setting command given by the "record mode" key 8 and causes the subprocessor 37 to continue to scan the keys until a next key operation is detected.

If the determination in step S21 is YES (the brightness of the environment of the camera body 1 is above the reference value when the "record mode" key 8 is operated), the CPU 26 causes the subprocessor 37 to feed power to the components of the camera concerned with the record mode in addition to the optical and image-capturing systems (step S22). Then, the CPU 26 proceeds to the record mode operation, thereby causing the motor controller 267 to protrude the image capturing lens unit 2 forward from the camera body 1 (step S23), and then the CPU 26 starts to display a corresponding through image on the liquid crystal monitor 15 (step S24).

At this time, the CPU 26 reads the number of occurrences of key operation errors stored in the flash memory 38 and then displays the number for a predetermined time over a part of the through image (step S25). Then, the CPU 26 resets the number of times of occurrence of key operation errors (step S26) and performs other operations in the record mode.

(Operation of the "power on" key 4)

Figure 4:
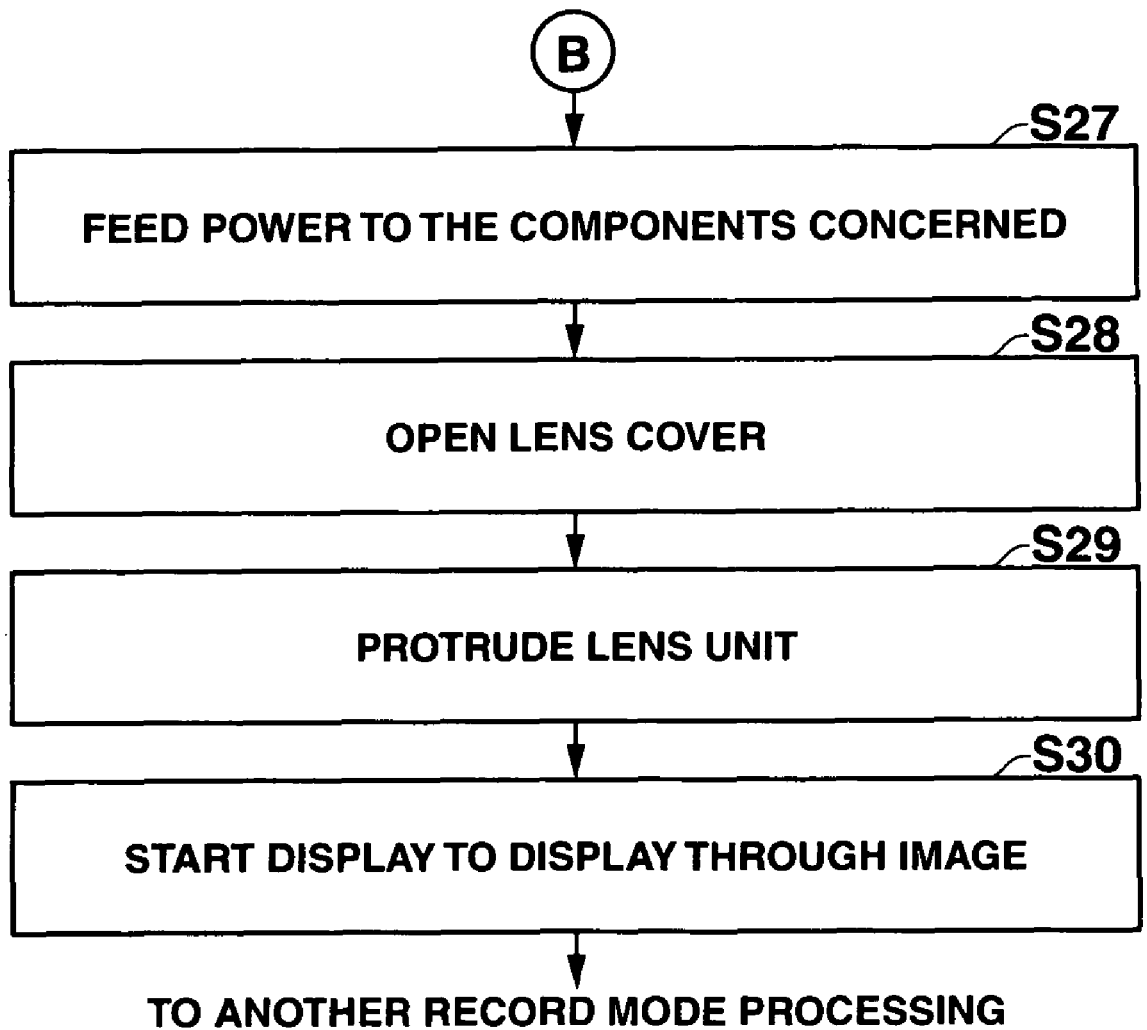
FIG. 4 is a flowchart continuing from FIG. 3.

When the subprocessor 37 detects operation of the "power on" key 4 independent of whether or not the "record mode" key 8 or "playback mode" key 9 was operated (YES in step S3), the CPU 26 determines whether or not this state has continued for a predetermined time, for example, for 1-2 seconds. If not (NO in step S4), the CPU 26 invalidates the power source turn-on command given by the "power on" key 4 and then returns to step S1. If the opreration of the "power on" key 4 continues for the predetermined time period (YES in step S4), the CPU 26 goes to step S27 of FIG. 4 to cause the subprocessor 37 to feed power immediately from the power source to the appropriate components of the camera.

Then, the CPU 26 shifts to an operation in the record mode where the CPU 26 causes the lens cover controller 264 to open the lens cover 7 (step S28) and also causes the motor controller 267 to protrude the image capturing lens unit 2 forward from the camera body 1 (step S29). The CPU 26 then starts to display a through image on the liquid crystal monitor 15 (step S30) and performs other operations in the record mode.

In the embodiment described above, if the brightness of the environment of the camera body 1 is above the reference value when the "record mode" key 8 or "playback mode" key 9 is operated, the power-source turn-on command and the record or playback mode setting command is validated, thereby immediately enabling the user to turn on the power source and to use the camera in a desired mode. Thus, the user can turn on the power source rapidly as required. If the brightness of the environment of the camera body 1 is below (or equal to) the reference value when the "record mode" key 8 or the "playback mode" key 9 is operated, the power source turn-on command and the mode setting command are invalidated, thereby preventing the power source from being turned on due to an operation error. Thus, the convenience obtained by allocating the power-source turn-on function to the "record mode" key 8 and/or the "playback mode" key 9 is maintained while occurrences of power-source turn-on operation errors are prevented.

In addition, according to the embodiment described above, the "power on" key 4 is required to be operated for a predetermined time, thereby preventing the power source from being erroneously turned on, and then the power source is turned on immediately. Thus, even when the brightness of the environment of the camera body 1 is below the reference value, the user is able to turn on the power source surely with the "power on" key 4.

With the structure of the embodiment described above, when the CPU 26 determines that the operation of the "record mode" key 8 or the "playback mode" key 9 is erroneous and invalidates the power-source turn-on command, the alarm notifies the user that the operation of the "record mode" key 8 or the "playback mode" key 9 was erroneous, which warns the user against a possible occurrence of a second operation error, and hence against a situation in which the power source is liable to be turned on erroneously.

When the power-source turn-on command is validated, according to the embodiment described above the user is notified of the number of occurrences of operation errors of the "record mode" key 8 and the "playback mode" key 9 before the power-source turn-on command was validated. Thus, this warns the user against a possible occurrence of a further operation error of this key, thereby eliminating a possible occurrence of a state in which the power source is liable to be operated erroneously.

As described above, the camera is configured such that the brightness of the environment of the camera body 1 present when the "record mode" key 8 or the "playback mode" key 9 is operated is detected based on the integrated value of several frames of luminance (Y) component of the captured image signal from the CCD 27 based on the quantity of electric charges stored in the CCD 27. Thus, the structure of the embodiment described above enables an erroneous power-source turning-on operation to be prevented while maintaining the user's convenience at low cost compared to a camera in which a separate luminance sensor is provided (which includes, for example, a photoconductive cell such as a CDS cell, a photodiode, a phototransistor or a photocell). When the present invention is applied to a digital camera that includes such a luminance sensor, this sensor can be used in the present invention to determine the brightness of the environment of the camera.

While in the embodiment described above the brightness of the environment of the camera body is determined based on the integrated value of several frames of luminance (Y) component of the captured image signal outputted from the CCD 27, the brightness may be determined based on information excluding the luminance information contained in the captured image signal, such as, for example, a level of the captured image signal.

According to the embodiment described above, when the luminance of the environment of the camera body confirmed by operation of the "record mode" key 8 or the "playback mode" key 9 is below (or equal to) the reference value, the opened lens cover 7 is closed (steps S9). In addition, when the luminance of the environment of the camera body confirmed by operation of the "playback mode" key 9 is above the reference value, the opened lens cover 7 is closed (step S13). Thus, even when the camera body has the lens cover 7 as in this embodiment, the luminance of the environment of the camera body can be detected by the CCD 27 without impeding the protecting function of the lens cover 7.

According to the embodiment described above, when the power-source turn-on command and the record mode setting command are invalidated in spite of operation of the "record mode" key 8, the forward protruding operation of the image capturing lens unit 2 is simultaneously invalidated. Thus, when the image capturing lens unit 2 is retractable as in this embodiment, it is ensured that the mechanism that protrudes the image capturing lens unit 2 forward is prevented from being broken due to an erroneous turning-on operation of the power source.

While in the embodiment described above the power-source turn-on function is allocated to the "record mode" key 8 or the "playback mode" key 9 having the record mode setting function and the playback mode setting function, respectively, and the structure and operation of the present invention is described with respect to the "record mode" key 8 and the "playback mode" key 9, the power-source turn-on function does not necessarily have to be allocated to those keys, and the operation of the present invention can be applied to other keys of the digital camera.

As an example, the "power on" key 4 may be used in place of the "record mode" key 8 and/or the "playback mode" key 9 in the operation of the embodiment described above. In this case, when the power-source turn-on command is given by the "power on" key 4, the "power on" key 4 need not continue to be operated for the predetermined time. According to this example, when the "power on" key is operated, the power-source turn-on command should be validated only when the brightness of the environment of the camera body is above the reference value to enable step S27 and the subsequent steps (see FIG. 4) to be performed. This serves to maintain the user's convenience while preventing the power source from being erroneously operated. In this case, a separate slide-type key, which is not easy to inadvertently operate to give the power-source turn-on command (compared to a push-button type switch such as the "power on" key 4, the "record mode" key 8 or the "playback mode" key 9), should preferably be assigned the power-source turn-on function. In this case, as in the embodiment described above it is ensured that the user can turn on the power source as required irrespective of the brightness of the environment of the camera body.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. An image capturing apparatus comprising:
   a plurality of operation members;
   a display;
   a power source controller for controlling a power supply to the image capturing apparatus to be in one of: (i) an on state, and (ii) an off state, wherein the off state is a state such that operation of the operation members is detectable while the power supply is off;
   an image capturing unit;
   a detector which detects when any one of the plurality of operation members is operated when the power supply is in the off state;
   a brightness acquiring section which controls the image capturing unit to acquire a brightness of an environment of the image capturing apparatus, when the detector detects that one of the operation members has been operated when the power supply is in the off state;
   a determining section which determines whether or not the acquired brightness is above a predetermined level;
   an image capturing controller which permits the image capturing unit to capture an image of a subject only if the determining section determines that the acquired brightness is above the predetermined level;
   a counter which counts a number of times that the determining section has determined that the acquired brightness is below the predetermined level in response to the detector detecting that one of the plurality of operation members is operated when the power supply is in the off state;
   a count storage section which stores the number of times counted by the counter; and
   a display controller which causes the display to display the stored number of times, when the determining section determines that the acquired brightness is above the predetermined level.

2. The image capturing apparatus of claim 1, further comprising:
   a cover which covers a light path to the image capturing unit;
   a moving section which moves the cover; and
   a movement controller which retracts the cover from the light path to permit the brightness acquiring section to acquire the brightness of the environment of the camera, when the detector detects that one of the operation members has been operated, and which covers the light path with the cover again if the determining section determines that the acquired brightness is below the predetermined level.

3. The image capturing apparatus of claim 2, further comprising:
   a storage section which stores at least one image;
   wherein the display controller causes the display to display the stored image, when the detector detects that a given one of the operation members has been operated and when the determining section determines that the acquired brightness is above the predetermined level.

4. The image capturing apparatus of claim 3,
   wherein the display controller causes the display to display the stored number of times along with the stored image, when the detector detects that the given one of the operation members has been operated and when the determining section determines that the acquired brightness is above the predetermined level.

5. The image capturing apparatus of claim 1, further comprising:
   a lens unit; and
   a position adjuster which adjusts relative positions of the lens unit and the image capturing unit to focus the image of the subject on the image capturing unit;
   wherein the brightness acquiring section acquires the brightness before the position adjuster adjusts the relative positions of the lens unit and the image capturing unit.

6. The image capturing apparatus of claim 5, further comprising a lens barrel which supports the lens unit;
   wherein the lens barrel is extended by the position adjuster when the detector detects that a given one of the operation members is operated.

7. The image capturing apparatus of claim 1, wherein the display controller causes the display to display a captured image together with the stored number of times that the determining section has determined that the acquired brightness is below the predetermined level, when the detector detects that a given one of the operation members has been operated and when the determining section determines that the acquired brightness is above the predetermined level.

8. The image capturing apparatus according to claim 1, further comprising a notifying section which notifies when the determining section determines that the acquired brightness is below the predetermined level.

9. The image capturing apparatus of claim 1, wherein the brightness acquiring section comprises an integrator which obtains luminance of a captured image signal from the image capturing unit when the image capturing unit is controlled to acquire the brightness of the environment, and which integrates the luminance, and wherein the brightness of the environment is acquired based on the integrated luminance.

10. A power controlling method to be performed in an electronic apparatus including a plurality of operation members, an image capturing unit, a display, and a power source controller for controlling a power supply to the image capturing apparatus to be in one of: (i) an on state and (ii) an off state, wherein the off state is a state such that operation of the operation members is detectable while the power supply is off, said method comprising:
   detecting when any one of the plurality of operation members is operated when the power supply is in the off state;
   controlling the image capturing unit to acquire a brightness of an environment of the apparatus, when it has been detected that one of the operation members has been operated when the power supply is in the off state;
   determining whether the acquired brightness is above a predetermined level;

permitting the image capturing unit to capture an image of a subject only if it is determined that the acquired brightness is above the predetermined level;

counting a number of times that it has been determined that the acquired brightness is below the predetermined level in response to the detection that one of the plurality of operation members is operated when the power supply is in the off state;

storing the counted number of times; and controlling the display to display the stored number of times, when the acquired brightness is determined to be above the predetermined level.

11. A non-transitory computer readable storage medium having a computer readable program stored thereon that is executable by a CPU of an electronic apparatus including a plurality of operation members, an image capturing unit, a display, and a power source controller for controlling a power supply to the image capturing apparatus to be in one of: (i) an on state and (ii) an off state, wherein the off state is a state such that operation of the operation members is detectable while the power supply is off, said program being executable by the CPU to cause the CPU to control the apparatus to perform a process comprising:

detecting when any one of the plurality of operation members has been operated when the power supply is in the off state;

controlling the image capturing unit to acquire a brightness of an environment of the apparatus, when it has been detected that one of the operation members has been operated when the power supply is in the off state;

determining whether the acquired brightness is above a predetermined level;

permitting the image capturing unit to capture an image of a subject only if it is determined that the acquired brightness is above the predetermined level;

counting a number of times that it has been determined that the acquired brightness level is below the predetermined level in response to the detection that one of the plurality of operation members is operated when the power supply is in the off state;

storing the counted number of times; and controlling the display to display the stored number of times, when the acquired brightness is determined to be above the predetermined level.

12. An image capturing apparatus comprising:

a plurality of operation keys;

a display;

power source control means for controlling a power supply to the image capturing apparatus to be in one of (i) an on state, and (ii) an off state, wherein the off state is a state such that operation of the operation keys is detectable while the power supply is off;

capturing means for capturing an image;

detecting means for detecting when any one of the plurality of operation keys is operated when the power supply is in the off state;

acquiring means for controlling the capturing means to acquire a brightness of an environment of the image capturing apparatus, when the detecting means detects that one of the operation keys has been operated when the power supply is in the off state;

determining means for determining whether the acquired brightness is above a predetermined level;

controlling means for permitting the capturing means to capture an image of a subject only if the determining means determines that the acquired brightness is above the predetermined level;

counting means for counting a number of times that the determining section has determined that the acquired brightness is below the predetermined level in response to the detector detecting that one of the plurality of operation members is operated when the power supply is in the off state;

storing means for storing the number of times counted by the counter; and controlling means for controlling the display to display the stored number of times, when the determining section determines that the acquired brightness is above the predetermined level.

* * * * *